R. J. OWENS.
GRAIN SEPARATOR.
APPLICATION FILED SEPT. 16, 1912.

1,051,157.

Patented Jan. 21, 1913.

WITNESSES

INVENTOR
ROBERT J. OWENS
ATTORNEYS

R. J. OWENS.
GRAIN SEPARATOR.
APPLICATION FILED SEPT. 16, 1912.

1,051,157.

Patented Jan. 21, 1913.
2 SHEETS—SHEET 2.

WITNESSES

INVENTOR
ROBERT J. OWENS
BY
ATTORNEYS

UNITED STATES PATENT OFFICE.

ROBERT J. OWENS, OF MINNEAPOLIS, MINNESOTA.

GRAIN-SEPARATOR.

1,051,157. Specification of Letters Patent. Patented Jan. 21, 1913.

Application filed September 16, 1912. Serial No. 720,513.

*To all whom it may concern:*

Be it known that I, ROBERT J. OWENS, a citizen of the United States, and resident of Minneapolis, in the county of Hennepin and State of Minnesota, have invented certain new and useful Improvements in Grain-Separators, of which the following is a specification.

This invention relates particularly to improvements in grain separators, and my improvements are usually applied to the class of separators known as fanning mills.

The improvements are designed especially for separating wheat from oats, though capable of separating other grains and seeds.

The object of my present invention is to provide a grain separator having large capacity by means of which different grains or seeds, particularly wheat and oats, may be readily separated from each other.

The invention consists generally in the constructions and combinations hereinafter described and particularly pointed out in the claims.

Figure 1:
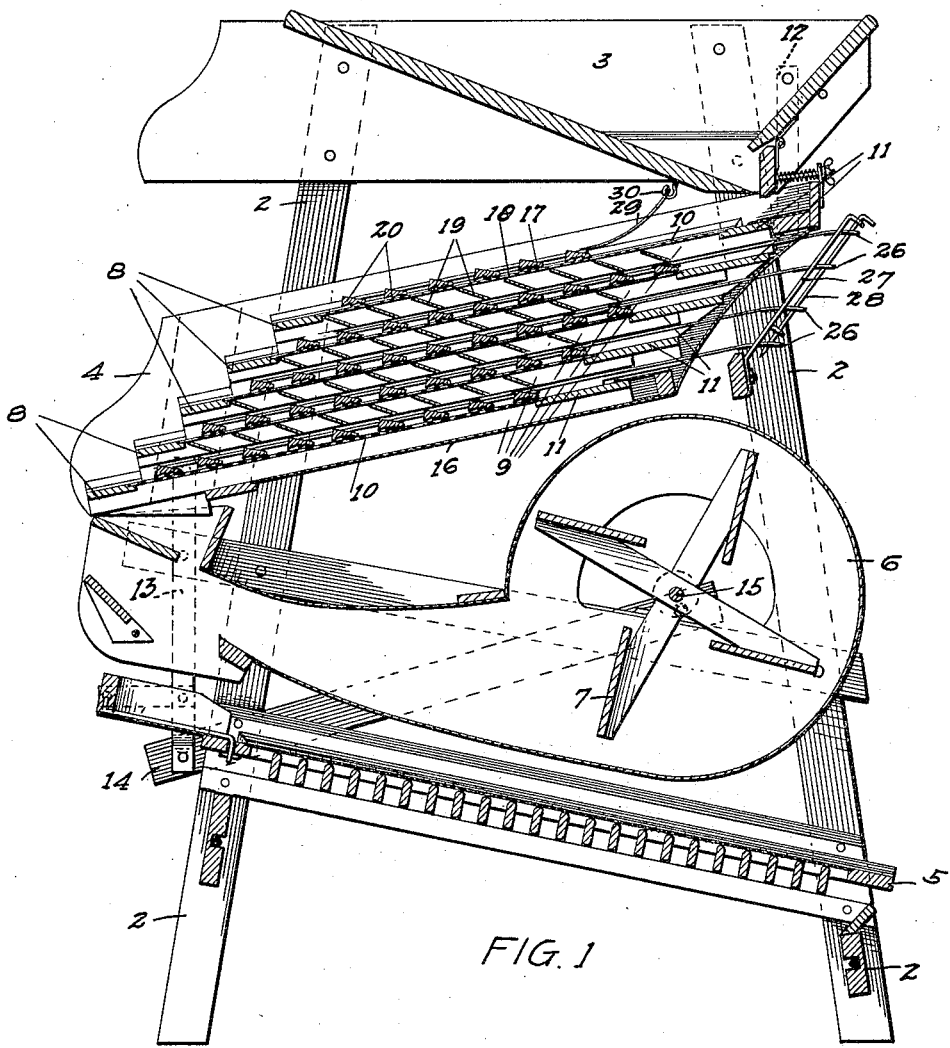
Figure 2:
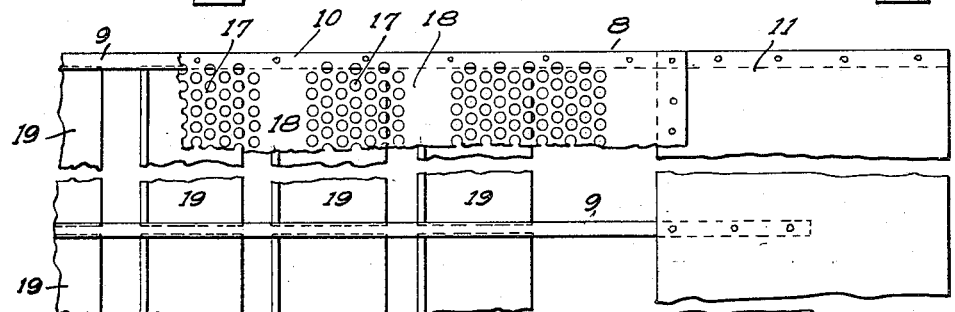
Figure 3:
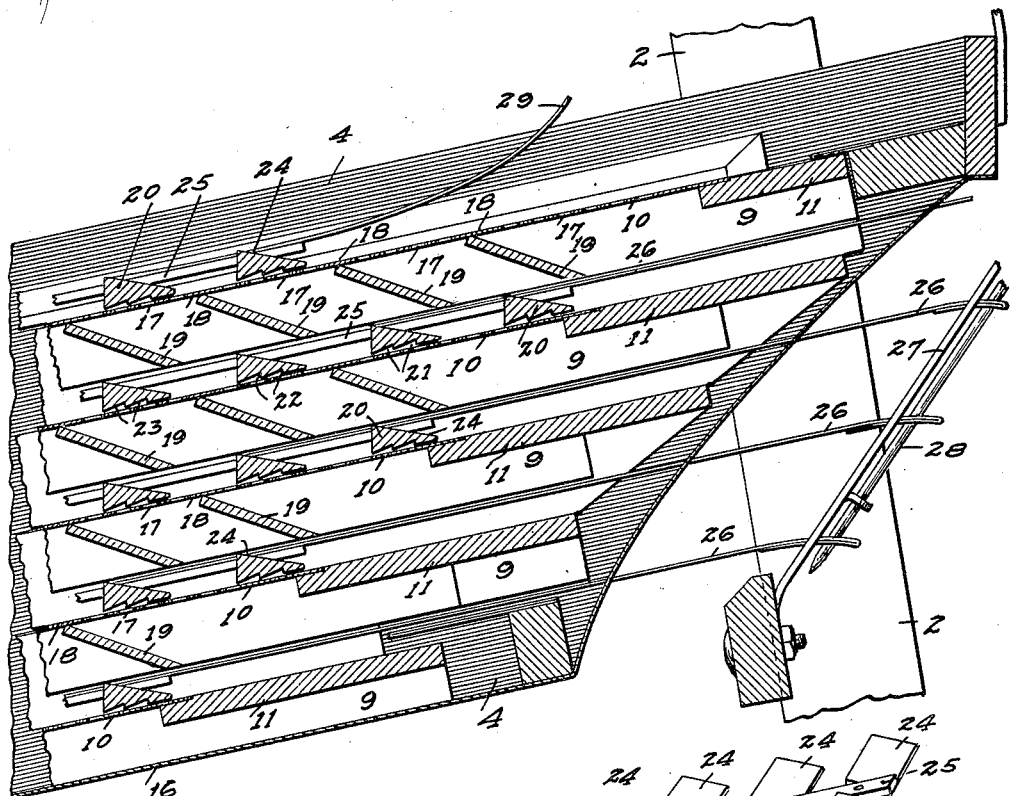
Figure 4:
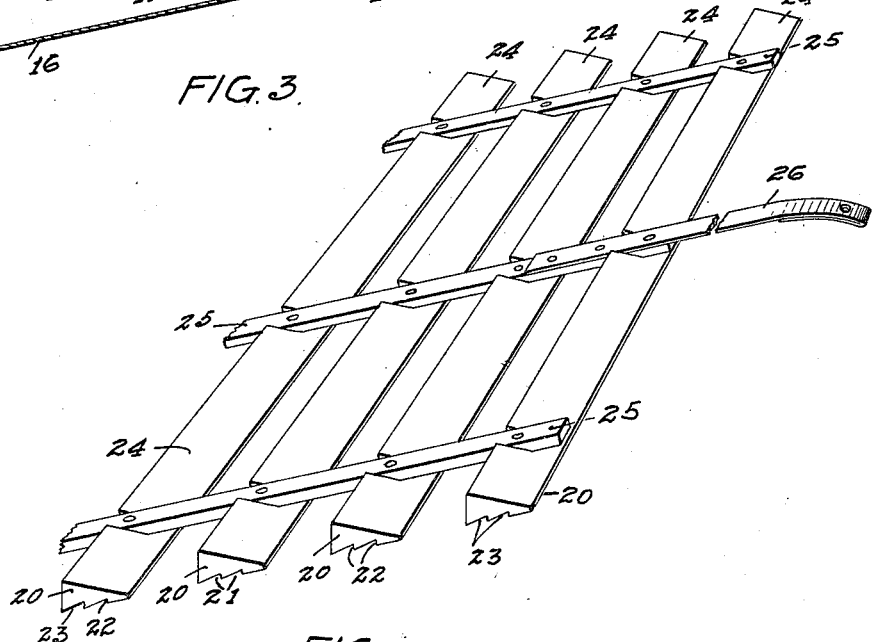

In the accompanying drawings, forming part of this specification, Figure 1 is a longitudinal, vertical section of a grain separator or fanning mill, embodying my invention, Fig. 2 is a plan view of one of the sieves showing parts broken away to show the position and arrangement of the return boards and longitudinal brace of sieve-frame, Fig. 3 is a longitudinal vertical section on a larger scale, showing the head portion of a shoe and sieves mounted therein illustrated in Fig. 1, Fig. 4 is a perspective view of a portion of the feed bars.

In the drawings, 2 represents the frame of the fanning mill, which is here shown as provided with a feed hopper 3, a longitudinally reciprocating upper sieve shoe 4, a lower reciprocating sieve 5, a fan casing 6, and a fan 7, located in said casing, and arranged to cause a blast or current of air to pass through the grain and material that is falling from the upper shoe.

The upper shoe is preferably provided with a series of sieves 8, each sieve preferably consisting of a suitable sieve frame 9 and a perforated sheet metal sieve plate 10. The sieves 8 are mounted in the shoe 4 in the usual way, with the lower end of each sieve projecting beyond the lower end of the sieve next above it in the manner in which such sieves are usually arranged.

The head of each sieve frame is prefer- ably provided with a board or deck 11, and the shoe 4 in which said sieves are mounted is preferably supported at its upper end by hangers 12, and at its lower end upon pivoted supporting arms 13. The lower ends of the arms 13 are preferably connected to bars 14 that are in turn connected with suitable crank pins carried by the fan shaft 15. This fan shaft carries the fan 7 arranged within the casing 6. The arms 13 are also connected to the lower sieve 5 by suitable links. By this means as the shaft 15 is rotated the shoe 4 is given a longitudinal reciprocatory movement. The lower sieve is also reciprocated. The grain from the hopper passes on to the upper end of the top sieve in the shoe 4 and the vibratory movement of the shoe tends to cause the grain to work toward the lower end of the shoe and during this operation one grain is separated from another by the passage of one grain over the tail end of the sieves while the other passes through the sieves on to a lower deck 16.

Fanning mills having shoes with perforated sieves arranged therein, substantially as shown in the drawings are in common use, and have been for many years. In some instances such sieves are without any riders and the sieve plates are uniformly perforated throughout. With this construction the greater part of the oats will travel over the sieves, while practically all of the wheat will pass through the sieves on to the deck 16. It is found, however, that more or less of the oats will pass through the sieves and mingle with the wheat. In order that the oats may pass through the holes or perforations in the sieves they must turn up endwise, as the length of the oats is such that they cannot pass through the perforations while lying flat upon the sieve. Many devices have been proposed for causing the oats to lie flat upon the sieves while passing over them. Devices for this purpose, with which I am familiar, while assisting in holding the oats flat, greatly retard the flow of the grain, and, therefore, lessen the capacity of the machine.

I preferably provide sieves 10, each, except the upper, having perforated sections 17 and unperforated sections 18. The perforated and unperforated sections alternate with each other. The upper sieve may be perforated throughout. Secured to each sieve frame in a reversely inclined direction and with their upper edges close against and forming supports for the sieve plates, are a series of return boards 19, each of which comes under a perforated section of the sieve plate above, with the lower edge of each plate terminating above the lower edge of an unperforated section of the sieve below. With this construction all of the grain passing through any sieve will fall upon an unperforated section of the sieve next below or it will fall upon the upper surface of a return board 19 and will slide off from said return board on to an unperforated section of the sieve below. Having fallen upon the unperforated section of a sieve the grain will slide over said unperforated section on to the next perforated section of the sieve. When the grain arrives upon this perforated section, the shorter kernels such as wheat will pass through the perforations, while the longer kernels, such as oats, or the greater portion thereof, will pass over the perforated section on to the next unperforated section and so on, until they are discharged over the tail-end of the sieve.

In order to accelerate the travel of the grain over the sieves, I preferably provide a series of feed bars 20 arranged over the perforated sections and under which the grain passes as it slides from the unperforated to the perforated sections. These bars are preferably provided on their lower surfaces with grooves 21 extending lengthwise of the bars, each groove having an abrupt or nearly vertical wall 22 toward the head end of the machine, and a long inclined upper wall 23 extending from the upper edge of said vertical wall to the lower edge of the next vertical wall, or to the lower edge of the outer wall of the bar. This gives to the grooves each in cross section, substantially, the shape of a ratchet tooth. The upper surface 24 of each bar is preferably inclined in the same direction as the return board 19, so that if any grain does get on to the top of the bar it will slide toward the head of the sieve and pass off from the top of the feed bar on to an unperforated section of the sieve.

The feed bars 20 are preferably connected by strips or slats 25 preferably formed of wood or other rigid material, and these strips connect the feed bars into a rigid grid. I have generally used three strips for connecting the feed bars for each sieve and I have usually located the bars so that the distance between any two bars is substantially equal to the width of a bar.

I preferably anchor the grids or feed bars to some stationary part of the sieve frame, so that said bars do not partake of the reciprocatory movement of the sieve shoe and sieves. As here shown each grid of feed bars is preferably provided with an anchoring bar 26 and the ends of these bars pass through an anchoring strap 27 secured to the frame of the machine and are held in place by a pin 28 that passes through perforations in all of the bars 26. For convenience I may anchor the upper grid by a strap 29 to a hook or support 30 on the under wall of the hopper. The result of this arrangement is that the grids are all maintained in a fixed position in reference to the frame of the machine, while the shoe 4 and the sieves reciprocate under said feed bars. This causes the vertical walls of the grooves and the vertical walls at the lower outer edge of the bar to act as pushers or feeders to accelerate the movement of the grain over the sieves toward the tail-end thereof, and at the same time the grain is held flat, or prevented from turning up endwise while it is under each bar.

The advantages of this construction are very great. A substantially perfect separation of wheat from oats is obtained while the grain is hurried or crowded through the machine, and is caused to move much more rapidly than it will do where its passage depends upon gravity alone.

Ordinary perforated metal sieves usually sag toward the center and hence the grain tends to work toward the center instead of remaining evenly distributed over the entire surface of the sieve, and where riders are used upon sieves such riders, unless formed of very flexible material, will not come in contact with the top of the sieve plate in the central portion where it will sag. In my construction the sieve plates are prevented from sagging by the upper edges of the return boards, which are preferably close to the under surface of the overlying sieve plate and by the longitudinal inner bars 9 of the frame (see Fig. 2), which are preferably employed and extend lengthwise of the sieve frame with their upper edges in contact with the under surface of the sieve plate. With this construction the sieve plates are prevented from sagging and are kept in a perfectly flat and horizontal position.

The details of the construction may be varied in many particulars without departing from my invention.

I claim as my invention:

1. The combination, in a grain separator, with a series of superimposed sieves, each provided with alternating perforated and unperforated sections, of a return board arranged below each perforated section and inclined toward the head end of the sieve, with its lower edge above an unperforated section of the sieve below, and transverse feed bars resting upon and supported by the perforated sections of said sieves whereby the grain passing through a perforated section is fed onto an unperforated section of the sieve below and then passes onto a perforated section and beneath a transverse feed bar, substantially as described.

2. The combination, in a grain separator, with a series of superimposed sieves, provided with alternating perforated and unperforated sections, of a return board arranged below each perforated section and inclined toward the head end of the sieve, and with its lower edge above an unperforated section of the sieve below, and transverse feed bars provided with grooved under surfaces resting upon and supported by the perforated sections of said sieves whereby grain passing through the perforated sections is directed by the return boards to the unperforated sections of the sieves below and then passes onto the perforated sections beneath said feed bars.

3. The combination, in a grain separator, with a series of superimposed sieves, provided with alternating perforated and unperforated sections, of a return board arranged below each perforated section and inclined toward the head end of the sieve, and with its lower edge above an unperforated section of the sieve below, transverse feed bars resting upon and supported by the perforated sections of said sieve, means for anchoring said feed bars, and means for reciprocating said sieves.

4. The combination, in a grain separator, with a series of superimposed sieves, provided with alternating perforated and unperforated sections, of a return board arranged below each perforated section and inclined toward the head end of the sieve, and with its lower edge above an unperforated section of the sieve below, transverse feed bars resting upon and supported by the perforated sections of said sieves and having their upper surfaces inclined toward the head ends of said sieves, means for anchoring said feed bars, and means for reciprocating said sieves.

5. The combination, in a grain separator, with a series of superimposed sieves, provided with alternating perforated and unperforated sections, of transverse feed bars resting upon and supported by the perforated sections of said sieves, and having their upper surfaces inclined toward the head ends of said sieves, and means for reciprocating said sieves.

6. The combination, in a grain separator, with a series of superimposed sieves, provided with alternating perforated and unperforated sections, of transverse feed bars resting upon and supported by the perforated sections of said sieves, means for anchoring said feed bars and means for reciprocating said sieves.

7. The combination, in a grain separator, with a series of superimposed sieves, of transverse feed bars having grooved lower surfaces resting upon said sieves, means for anchoring said feed bars and means for reciprocating said sieves.

8. The combination, in a grain separator, with a series of superimposed sieves, of transverse feed bars resting upon said sieves and having their upper surfaces inclined downwardly toward the head end of said sieves, means for anchoring said feed bars and means for reciprocating said sieves.

In witness whereof, I have hereunto set my hand this 13" day of September 1912.

ROBERT J. OWENS.

Witnesses:
GENEVIEVE E. SORENSEN,
C. H. REHFUSS.

---

Copies of this patent may be obtained for five cents each, by addressing the "Commissioner of Patents, Washington, D. C."